(12) United States Patent
Ha et al.

(10) Patent No.: US 8,700,467 B2
(45) Date of Patent: Apr. 15, 2014

(54) APPARATUS AND METHOD FOR PROVIDING CELL-BASED ADVERTISEMENT BROADCAST SERVICE IN BROADBAND WIRELESS COMMUNICATION SYSTEM

(75) Inventors: Ji-Hye Ha, Anyang-si (KR); Sung-Won Lee, Seongnam-si (KR); Dong-Keon Kong, Suwon-si (KR); Sang-Jun Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 860 days.

(21) Appl. No.: 12/386,278

(22) Filed: Apr. 16, 2009

(65) Prior Publication Data

US 2009/0265235 A1 Oct. 22, 2009

(30) Foreign Application Priority Data

Apr. 16, 2008 (KR) ........................ 10-2008-0035008

(51) Int. Cl.
*G06Q 30/00* (2012.01)
(52) U.S. Cl.
USPC ....................... 705/14.64; 370/312; 455/414.3
(58) Field of Classification Search
USPC .......................................... 370/312; 455/414
See application file for complete search history.

(56) References Cited

U.S. PATENT DOCUMENTS

| | | | |
|---|---|---|---|
| 6,104,709 A * | 8/2000 | Rinchiuso et al. | 370/335 |
| 6,115,390 A * | 9/2000 | Chuah | 370/443 |
| 6,246,872 B1 * | 6/2001 | Lee et al. | 455/414.1 |
| 6,549,775 B2 * | 4/2003 | Ushiki et al. | 455/432.1 |
| 6,571,279 B1 * | 5/2003 | Herz et al. | 709/217 |
| 6,731,944 B1 * | 5/2004 | Ostrup et al. | 455/458 |
| 6,954,641 B2 * | 10/2005 | McKenna et al. | 455/435.1 |
| 6,993,326 B2 * | 1/2006 | Link et al. | 455/414.1 |
| 7,233,781 B2 * | 6/2007 | Hunter et al. | 455/404.1 |
| 7,583,680 B1 * | 9/2009 | Suontausta | 370/401 |
| 7,672,280 B2 * | 3/2010 | Shim et al. | 370/338 |
| 7,991,396 B2 * | 8/2011 | Wang et al. | 455/435.1 |
| 8,015,064 B2 * | 9/2011 | Crolley | 705/14.69 |
| 8,027,877 B2 * | 9/2011 | Crolley | 705/14.63 |
| 8,108,893 B2 * | 1/2012 | Haberman et al. | 725/34 |
| 2002/0000930 A1 * | 1/2002 | Crowson et al. | 342/357.1 |
| 2003/0162553 A1 * | 8/2003 | Huang et al. | 455/458 |
| 2004/0157626 A1 * | 8/2004 | Park et al. | 455/458 |
| 2004/0158858 A1 * | 8/2004 | Paxton et al. | 725/42 |
| 2005/0075107 A1 * | 4/2005 | Wang et al. | 455/435.1 |
| 2005/0197125 A1 * | 9/2005 | Kang et al. | 455/439 |
| 2005/0207416 A1 * | 9/2005 | Rajkotia | 370/390 |
| 2005/0282571 A1 * | 12/2005 | Oprescu-Surcobe et al. | 455/503 |
| 2006/0075449 A1 * | 4/2006 | Jagadeesan et al. | 725/113 |
| 2006/0126556 A1 * | 6/2006 | Jiang et al. | 370/328 |
| 2006/0148493 A1 * | 7/2006 | Narasimha et al. | 455/458 |
| 2006/0209891 A1 * | 9/2006 | Yamada et al. | 370/468 |
| 2006/0223510 A1 * | 10/2006 | Takeda et al. | 455/415 |
| 2007/0058628 A1 * | 3/2007 | Palnati et al. | 370/390 |
| 2007/0162328 A1 * | 7/2007 | Reich | 705/14 |

(Continued)

*Primary Examiner* — John G Weiss
*Assistant Examiner* — Bennett Sigmond

(57) ABSTRACT

Provided is an apparatus and method for providing a cell-based advertisement broadcast service in a broadband wireless communication system. In an advertisement broadcast service of a service interface server in the broadband wireless communication system, an advertisement content transmission request message containing at least one of information about advertisement broadcast content, information about an advertisement broadcast zone, and information about an advertisement broadcast channel is received from a service provider. The received advertisement content transmission request message is transmitted to an MCBCS controller.

20 Claims, 4 Drawing Sheets

(56) References Cited

U.S. PATENT DOCUMENTS

| | | | |
|---|---|---|---|
| 2007/0220573 A1* | 9/2007 | Chiussi et al. | 725/114 |
| 2007/0233889 A1* | 10/2007 | Guo et al. | 709/231 |
| 2007/0264954 A1* | 11/2007 | Qi et al. | 455/186.1 |
| 2008/0014968 A1* | 1/2008 | Yoon | 455/456.5 |
| 2008/0025241 A1* | 1/2008 | Bhushan et al. | 370/312 |
| 2008/0026691 A1* | 1/2008 | Gao | 455/7 |
| 2008/0080408 A1* | 4/2008 | Gao | 370/312 |
| 2008/0089265 A1* | 4/2008 | Park et al. | 370/312 |
| 2008/0253322 A1* | 10/2008 | So et al. | 370/329 |
| 2009/0003265 A1* | 1/2009 | Agarwal et al. | 370/328 |
| 2009/0017815 A1* | 1/2009 | Takeda | 455/422.1 |
| 2009/0080365 A1* | 3/2009 | Song et al. | 370/312 |
| 2009/0163190 A1* | 6/2009 | Helferich | 455/414.3 |
| 2009/0307732 A1* | 12/2009 | Cohen et al. | 725/87 |
| 2011/0004511 A1* | 1/2011 | Reich | 705/14.1 |

* cited by examiner

APPARATUS AND METHOD FOR PROVIDING CELL-BASED ADVERTISEMENT BROADCAST SERVICE IN BROADBAND WIRELESS COMMUNICATION SYSTEM

CROSS-REFERENCE TO RELATED APPLICATION(S) AND CLAIM OF PRIORITY

The present application claims priority under 35 U.S.C. §119 to an application filed in the Korean Intellectual Property Office on Apr. 16, 2008 and assigned Serial No. 10-2008-0035008, the contents of which are incorporated herein by reference.

TECHNICAL FIELD OF THE INVENTION

The present invention relates generally to an advertisement broadcast service in a broadband wireless communication system, and in particular, to an apparatus and method for providing a cell-based advertisement broadcast service through a Universal Service Interface (USI) server that is an open network service interface.

BACKGROUND OF THE INVENTION

A mobile WiMAX system has a MultiCast and BroadCast Service (MCBCS) standard that can provide a multicast/broadcast service to a plurality of Mobile Stations (MSs). The MCBCS is a service that multicasts or broadcasts content to all the MSs in a Multicast and Broadcast Service (MBS) zone providing a specific broadcast service. Due to the characteristics of the mobile WiMAX system, the MCBCS can provide not only a downlink unidirectional broadcast service but also a bidirectional connection through an uplink connection.

A conventional MCBCS of the mobile WiMAX system can multicast or broadcast content to all the terminals in an MBS zone providing a specific broadcast service, but does not provide any interface for an advertisement broadcast. Also, the conventional MCBCS can provide an MBS zone-based service, but cannot specify each content by mapping an MBS zone and each channel. It is therefore necessary to provide an interface that supports the Quality of Service (QoS) or paging of content allocated to each channel.

SUMMARY OF THE INVENTION

To address the above-discussed deficiencies of the prior art, it is a primary object of the present invention is to substantially solve at least the above problems and/or disadvantages and to provide at least the advantages below. Accordingly, an object of the present invention is to provide an apparatus and method for providing a cell-based advertisement broadcast service in a broadband wireless communication system.

Another object of the present invention is to provide an apparatus and method for providing an advertisement broadcast service specified for each zone or channel in a broadband wireless communication system by using a USI server that is an open network service interface.

Another object of the present invention is to provide an apparatus and method for simultaneously requesting QoS/paging services in a broadband wireless communication system while transmitting a broadcast through an interface of a service provider and a USI server.

According to an aspect of the present invention, a method for providing an advertisement broadcast service of a service interface server in a wireless communication system includes: receiving an advertisement content transmission request message containing at least one of information about advertisement broadcast content, information about an advertisement broadcast zone, and information about an advertisement broadcast channel from a service provider; and transmitting the received advertisement content transmission request message to an MCBCS controller.

According to another aspect of the present invention, a method for providing an advertisement broadcast service of an MCBCS controller in a wireless communication system includes: receiving an advertisement content transmission request message containing at least one of information about advertisement broadcast content, information about an advertisement broadcast zone, and information about an advertisement broadcast channel from a service interface server; and transmitting an advertisement content transmission response message containing a Uniform Resource Locator (URL) of a content server, which is to store the content, to the service interface server.

According to another aspect of the present invention, an apparatus for providing an advertisement broadcast service in a wireless communication system includes: a service provider transmitting an advertisement content transmission request message containing at least one of information about advertisement broadcast content, information about an advertisement broadcast zone, and information about an advertisement broadcast channel; and a service interface server receiving the advertisement content transmission request message from the service provider and transmitting the received advertisement content transmission request message to an MCBCS controller.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE PREFERRED EMBODIMENTS

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides an apparatus and method for providing a cell-based advertisement broadcast service in a broadband wireless communication system.

In the following description, a Radio Access Station (RAS) may also be referred to as a Base Station (BS), and an Access Control Router (ACR) may also be referred to as an Access Service Network Gateway (ASN-GW).

Figure 1:
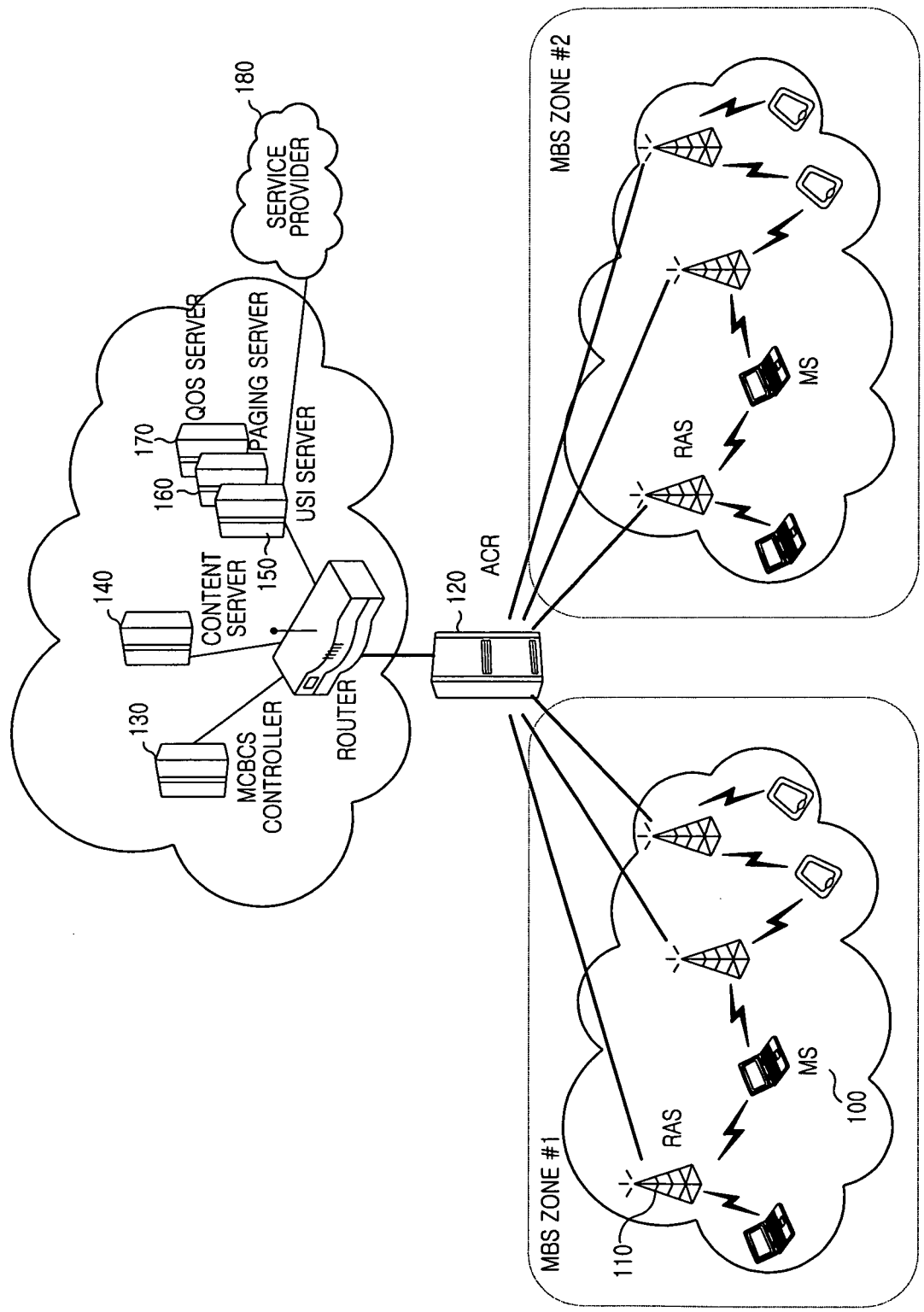
FIG. 1 is a diagram illustrating a network structure of a broadband wireless communication system according to the present invention.

FIG. 1 illustrates a network structure of a broadband wireless communication system according to the present invention.

Referring to FIG. 1, the broadband wireless communication system includes an MS 100, an RAS 110, an ACR 120, an MCBCS controller 130, a content server 140, a USI server 150, a paging server 160, a QoS server 170, and a service provider 180.

The service provider 180 is an MCBCS provider that is to provide an advertisement broadcast. When serving to provide a broadcast service, the service provider 180 may be a broadcasting station or a museum/apartment/shopping zone-based public advertisement broadcast provider. The service provider 180 notifies content information, such as content, channels and zones requesting an advertisement broadcast, to the USI server 150 through a U1 interface, and uploads the content to the content server 140 by using the URL of the content server 140 allocated through the USI server 150. Accordingly, the service provider 180 can provide an advertisement broadcast specified for each zone or channel. For example, the service provider 180 can provide a public advertisement broadcast for a specific building such as a museum or an art museum, a zone-based advertisement broadcast for a store targeted on neighboring users, and a public announcement broadcast for an apartment or a school.

The USI server 150 is an open network service interface that transmits information between the service provider 180 and the MCBCS controller 130 and provides the interfaces with the paging server 160 and the QoS server 170.

The paging server 160 is connected to the rear end of the USI server 150 to provide a paging function for notifying the start of an advertisement broadcast through the interface with the USI server 150.

The QoS server 170 is connected to the rear end of the USI server 150 to provide a QoS function for each content through the interface with the USI server 150.

The content server 140 transmits content that is stored by the service provider 180, to the MCBCS controller 130 at the request of the MCBCS controller 130.

The MCBCS controller 130 controls/manages an MCBCS and transmits a broadcast traffic to the ACR 120. Herein, the MCBCS controller 130 may be implemented by a separate server independent of the ACR 120 as described above, or may be implemented by a software function block of the ACR 120.

The ACR 120 performs packetization and time stamping and manages the connection and mobility of the MS 100. Also, the ACR 120 broadcasts content from the MCBCS 130 to the RASs in the corresponding MBS zone.

The RAS 110 provides a wireless connection to the MS 100.

The MS 100 provides an MCBCS to a user.

As illustrated in FIG. 1, each MBS zone includes a plurality of RASs, and the RASs in each MBS zone transmits the same MCBCS content to the corresponding MSs by using the same time or frequency resources. Herein, the MBS zone is the region where the RASs transmit the same broadcast content by using the same time or frequency resources.

Figure 2:
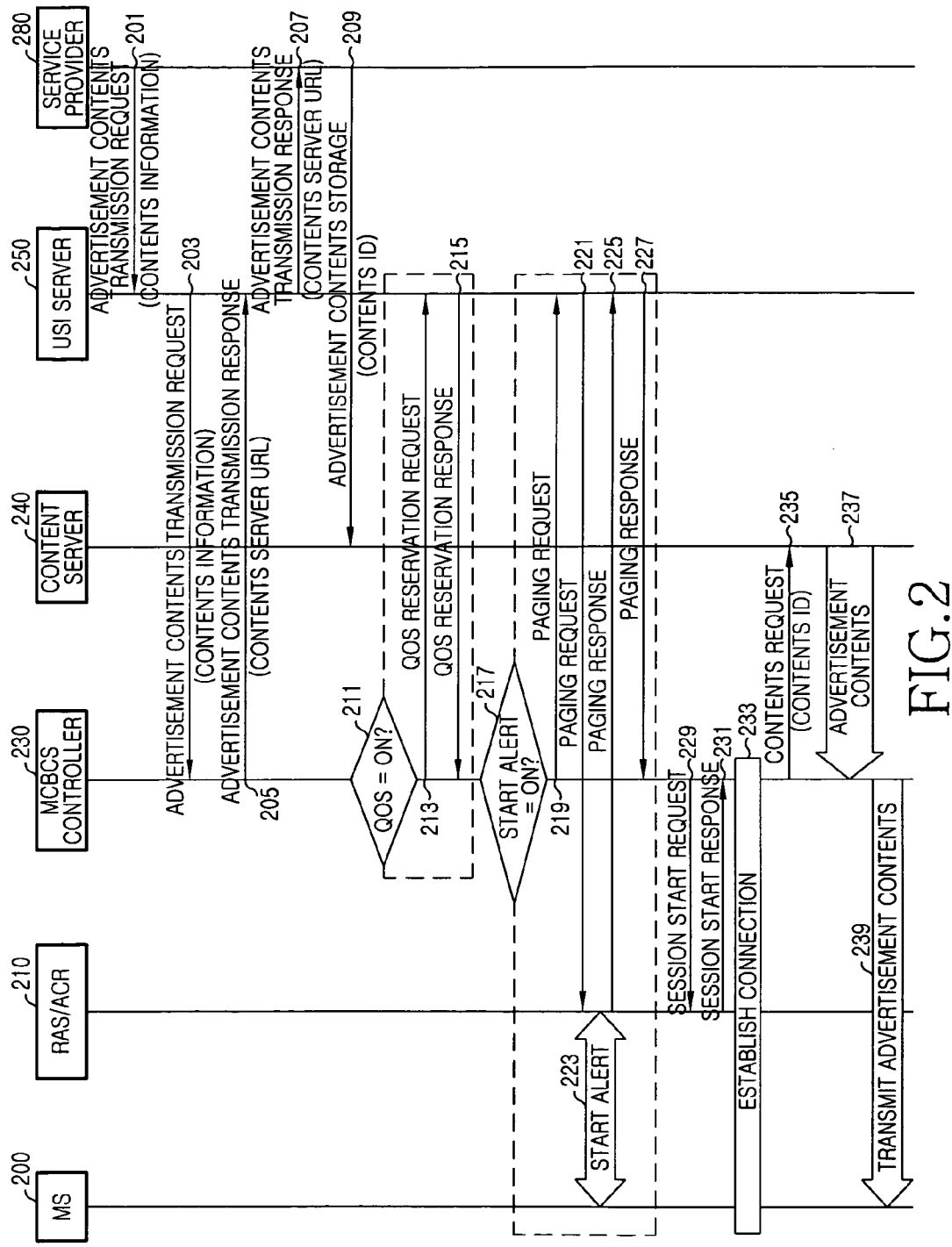
FIG. 2 is a signal flow diagram illustrating an overall process for performing a cell-based advertisement broadcast in a broadband wireless communication system according to an exemplary embodiment of the present invention.

FIG. 2 illustrates a signal flow diagram for an overall process for performing a cell-based advertisement broadcast in a broadband wireless communication system according to an exemplary embodiment of the present invention.

Referring to FIG. 2, in order to provide an advertisement broadcast service specified for each zone or channel, a service provider 280 selects content, channels and zones requesting an advertisement broadcast; determines whether to perform the corresponding QoS process and whether to perform a start alert (i.e., paging) process; generates content information containing information about the selected content, channels and zones, information about whether to perform the QoS process, and information about whether to perform the start alert process; generates an advertisement content transmission request message containing the content information; and transmits the advertisement content transmission request message to a USI server 250 in step 201. In step 203, the USI server 250 transmits the advertisement content transmission request message to an MCBCS controller 230 to request the broadcast transmission.

Herein, the content information may contain a content ID of the selected content, MBS zone IDs corresponding to the selected zones, channel numbers of the selected channels, information about whether to perform the QoS process, and information about whether to perform the start alert process, as shown in Table 1. Herein, the information about whether to perform the QoS process and the information about whether to perform the start alert process may be set to an 'ON' value indicating that the corresponding processes are to be performed, or to an 'Off' value indicating that the corresponding processes are not to be performed.

TABLE 1

|  | Advertisement Broadcast Channel 1 | Advertisement Broadcast Channel 2 | ... |
| --- | --- | --- | --- |
| MBS Zone #1 | QoS = ON<br>Start Alert = ON | QoS = OFF<br>Start Alert = ON |  |
| MBS Zone #2 | QoS = ON<br>Start Alert = OFF | QoS = OFF<br>Start Alert = OFF |  |
| MBS Zone #3 | QoS = OFF<br>Start Alert = ON | QoS = ON<br>Start Alert = ON |  |
| ... |  |  |  |

In step 205, upon receiving the advertisement content transmission request message, the MCBCS controller 230 allocates a content server 240 to store the corresponding advertisement content; and transmits an advertisement content transmission response message containing an URL of the content server 240 to the USI server 250. In step 207, the USI server 250 transmits the advertisement content transmission response message to the service provider 280.

In step 209, using the URL of the content server 240 contained in the advertisement content transmission response message, the service provider 280 transmits an advertisement content storage message including advertisement content and a content ID to the content server 240, thereby uploading the advertisement content and the content ID to the content server 240.

In step 211, the MCBCS controller 230 determines if the information about whether to perform the QoS process that is contained in the advertisement content transmission request message, has the 'ON' value. If the information about whether to perform the QoS process has the 'ON' value, the MCBCS controller 230 transmits a QoS reservation request message containing the content ID to the USI server 250 to request the QoS setting of the corresponding content, in step 213. In step 215, the USI server 250 sets the QoS of the corresponding content in connection with a QoS server and transmits a QoS reservation response message containing the QoS setting results to the MCBCS controller 230. Conversely, if the information about whether to perform the QoS process has the 'Off' value, the MCBCS controller 230 omits the steps 213 and 215.

In step 217, the MCBCS controller 230 determines if the information about whether to perform the start alert process that is contained in the advertisement content transmission request message, has the 'ON' value. If the information about whether to perform the start alert process has the 'ON' value, the MCBCS controller 230 transmits a paging request message containing the MBS zone ID to the USI server 250 to request the paging of the MSs receiving the service from the RASs in the corresponding MBS zone, in step 219. In step 221, the USI server 250 transmits the paging request message to an RAS/ACR 210 of the corresponding MBS zone in connection with a paging server. In step 223, upon receiving the paging request message, the RAS/ACR 210 performs the start alert process (i.e., the paging process) for an MS 200. In step 225, the RAS/ACR 210 transmits a paging response message containing the paging results to the USI server 250. In step 227, the USI server 250 transmits the paging response message to the MCBCS controller 230. On the other hand, if the information about whether to perform the start alert process has the 'Off' value, the MCBCS controller 230 omits the steps 219 to 227.

In step 229, the MCBCS controller 230 transmits a session start request message for connection establishment request to the RAS/ACR 210 in the corresponding MBS zone. In step 231, the MCBCS controller 230 receives a session start response message from the RAS/ACR 210 in the corresponding MBS zone. In step 233, the MCBCS controller 230 establishes the connection with the MS 200.

In step 235, the MCBCS controller 230 transmits a content request message containing the content ID, which is contained in the advertisement content transmission request message, to the content server 240. In step 237, the content server 240 transmits the advertisement content of the content ID to the MCBCS controller 230. In step 239, the MCBCS controller 230 transmits the received advertisement content to the MS 200.

Figure 3:
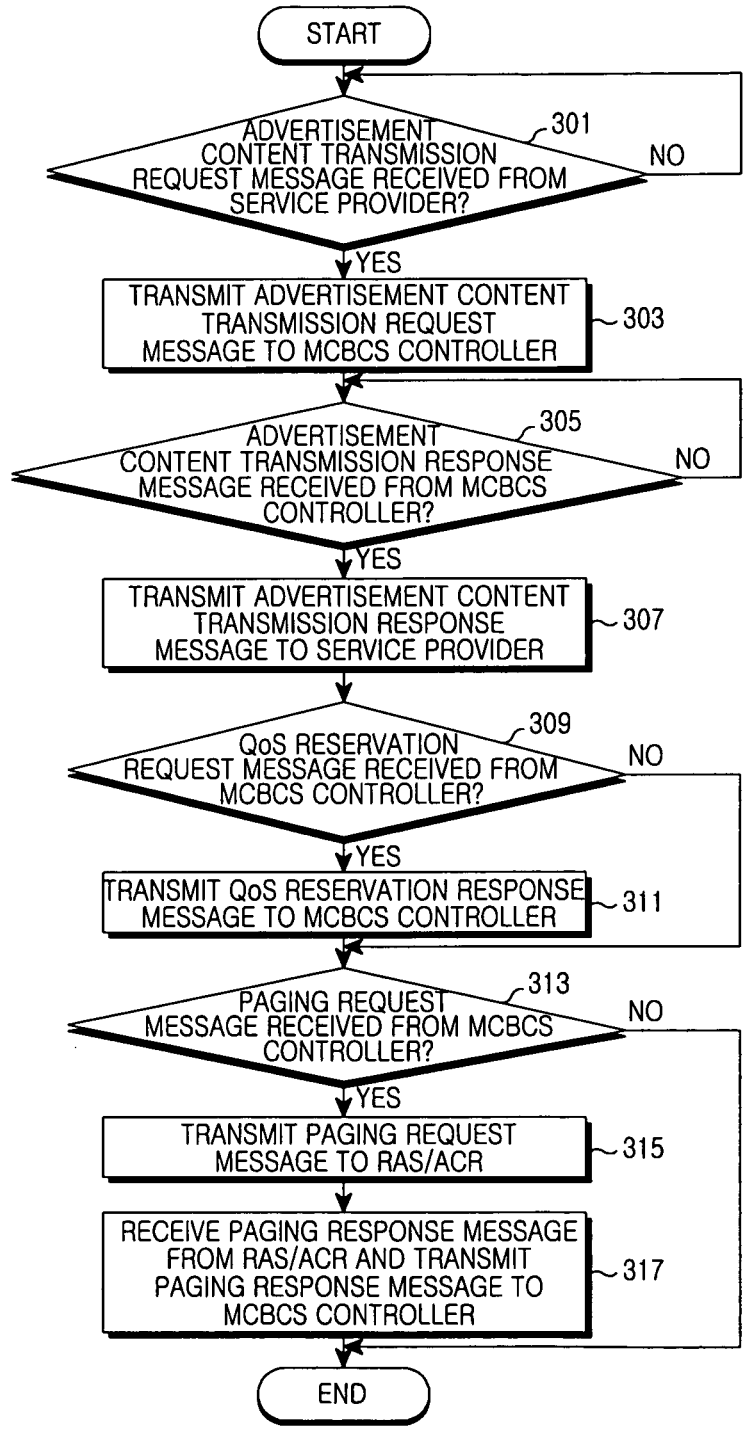
FIG. 3 is a flow chart illustrating an advertisement broadcast service providing process of a USI server in the broadband wireless communication system according to an exemplary embodiment of the present invention.

FIG. 3 illustrates a flow chart for an advertisement broadcast service providing process of the USI server in the broadband wireless communication system according to an exemplary embodiment of the present invention.

Referring to FIG. 3, in step 301, the USI server determines if an advertisement content transmission request message containing content information is received from the service provider. Herein, the content information may contain a content ID, an MBS zone ID, a channel number, information about whether to perform a QoS process, and information about whether to perform a start alert process, as shown in Table 1. If the advertisement content transmission request message is received from the service provider, the USI server proceeds to step 303. In step 303, the USI server transmits the advertisement content transmission request message to the MCBCS controller to request the transmission of advertisement content.

In step 305, the USI server determines if an advertisement content transmission response message containing the URL of the content server, which is to store the advertisement content, is received from the MCBCS controller. If the advertisement content transmission response message is received from the MCBCS controller, the USI server proceeds to step 307. In step 307, the USI server transmits the received advertisement content transmission response message to the service provider.

In step 309, the USI server determines if a QoS reservation request message containing the content ID is received from the MCBCS controller. If the QoS reservation request message is received from the MCBCS controller, the USI server proceeds to step 311. In step 311, the USI server sets the QoS of the corresponding content in connection with the QoS server and transmits a QoS reservation response message containing the QoS setting results to the MCBCS controller. However, if the QoS reservation request message is not received from the MCBCS controller, the USI server proceeds directly to step 313.

In step 313, the USI server determines if a paging request message containing the MBS zone ID is received from the MCBCS controller. If the paging request message containing the MBS zone ID is received from the MCBCS controller, the USI server proceeds to step 315. In step 315, the USI server transmits the paging request message to the RAS/ACR in the corresponding MBS zone in connection with the paging server. In step 317, the USI server receives a paging response message containing the paging results from the RAS/ACR and transmits the received paging response message to the MCBCS controller.

However, if the paging request message is not received from the MCBCS controller, the USI server ends the advertisement broadcast service providing process according to the present invention.

Figure 4:
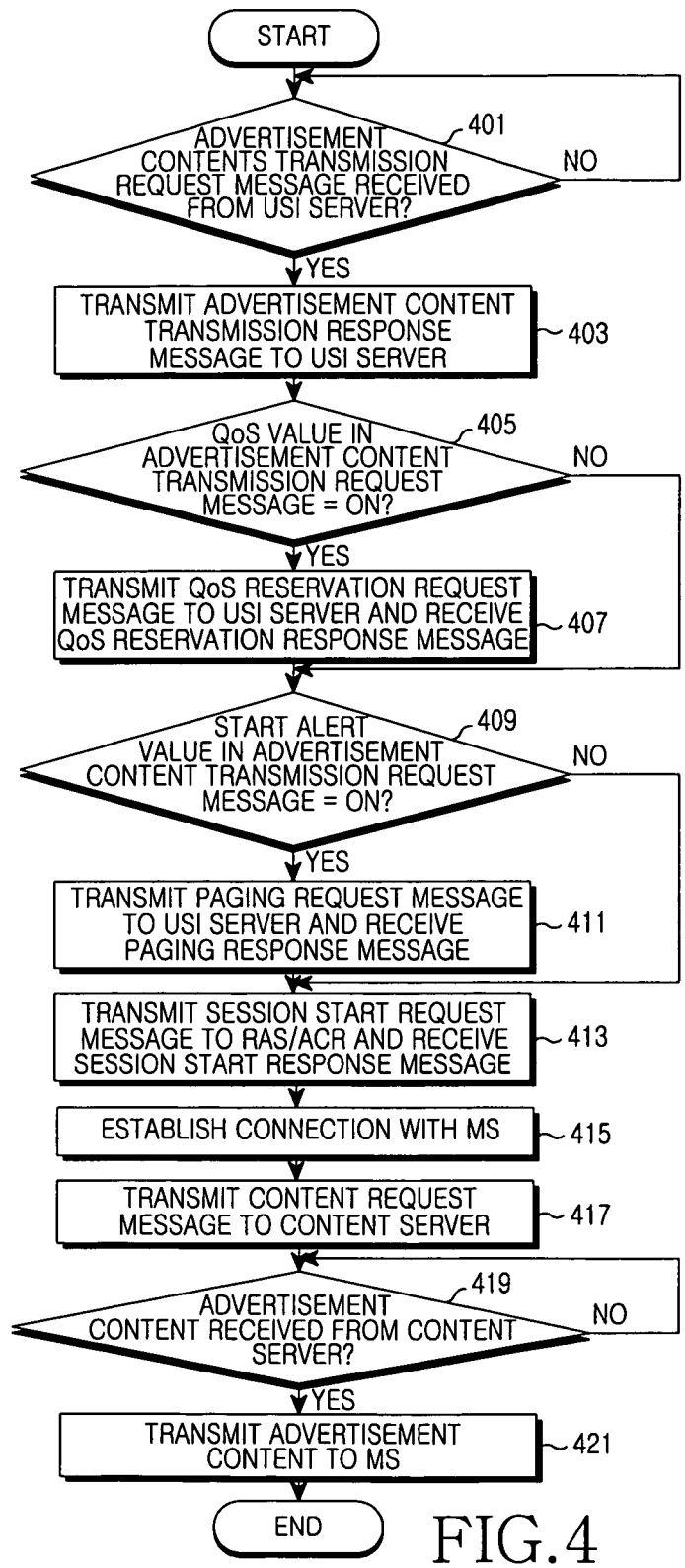
FIG. 4 is a flow chart illustrating an advertisement broadcast service providing process of an MCBCS controller in the broadband wireless communication system according to an exemplary embodiment of the present invention.

FIG. 4 illustrates a flow chart for an advertisement broadcast service providing process of the MCBCS controller in the broadband wireless communication system according to an exemplary embodiment of the present invention.

Referring to FIG. 4, in step 401, the MCBCS controller determines if an advertisement content transmission request message containing content information is received from the USI server. Herein, the content information may contain a content ID, an MBS zone ID, a channel number, information about whether to perform a QoS process, and information about whether to perform a start alert process, as shown in Table 1. If the advertisement content transmission request message is received from the USI server, the MCBCS controller proceeds to step 403. In step 403, the MCBCS controller allocates the content server, which is to store the corresponding advertisement content, and transmits the advertisement content transmission response message containing the URL of the allocated content server to the USI server.

In step 405, the MCBCS controller determines if the information about whether to perform the QoS process, which is contained in the advertisement content transmission request message, has the 'ON' value. If the information about whether to perform the QoS process has the 'ON' value, the MCBCS controller proceeds to step 407. In step 407, the MCBCS controller transmits a QoS reservation request message containing the content ID to the USI server to request the QoS setting of the corresponding content, and receives a QoS reservation response message containing the QoS setting results from the USI server. However, if the information about whether to perform the QoS process has the 'Off' value, the MCBCS controller proceeds directly to step 409.

In step 409, the MCBCS controller determines if the information about whether to perform the start alert process, which is contained in the advertisement content transmission request message, has the 'ON' value. If the information about whether to perform the start alert process has the 'ON' value, the MCBCS controller proceeds to step 411. In step 411, the MCBCS controller transmits a paging request message containing the MBS zone ID to the USI server to request the paging of the MSs receiving the service from the RASs in the corresponding MBS zone, and receives a paging response message containing the paging results from the USI server. However, if the information about whether to perform the start alert process has the 'Off' value, the MCBCS controller proceeds directly to step 413.

In step 413, the MCBCS controller transmits a session start request message for connection establishment request to the RAS/ACR in the corresponding MBS zone, and receives a session start response message from the RAS/ACR in the MBS zone. In step 415, the MCBCS controller 230 establishes the connection with the MS.

In step 417, the MCBCS controller transmits a content request message containing the content ID, which is contained in the advertisement content transmission request message, to the content server. In step 419, the MCBCS controller determines if the corresponding advertisement content is received from the content server. If the corresponding advertisement content is received from the content server, the MCBCS controller proceeds to step 421. In step 421, the MCBCS controller transmits the received advertisement content to the MS.

Thereafter, the MCBCS controller ends the advertisement broadcast service providing process according to the present invention.

As described above, the present invention provides an apparatus and method for providing a cell-based advertisement broadcast service through a USI server that is an open network service interface, thereby making it possible for a service provider to provide an advertisement broadcast specified for each zone or channel. For example, the service provider can provide a public advertisement broadcast of a specific building such as a museum or an art museum, a zone-based advertisement broadcast of a store targeted on neighboring users, and a public announcement broadcast of an apartment or a school. This creates new profit models of an MCBCS provider, thereby making it possible to increasing the system competitiveness. Also, the present invention can simultaneously request services such as QoS or paging while transmitting a broadcast through an interface of the service provider and the USI server, thereby making it possible to support QoS/paging services of content allocated to each channel.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing an advertisement broadcast service of a service interface server in a wireless communication system, the method comprising:
    receiving, at the service interface server, an advertisement content transmission request message comprising at least one of information about advertisement broadcast content, information about an advertisement broadcast zone, and information about an advertisement broadcast channel from an advertisement content service provider, the advertisement content transmission request message further comprising information indicating whether to perform a Quality of Service (QoS) process and information indicating whether to perform a start alert process;
    transmitting, by the service interface server, the received advertisement content transmission request message to a MultiCast and BroadCast Service (MCBCS) controller;
    when the information indicating whether to perform a QoS process indicates to perform a QoS process, receiving at the service interface server a QoS reservation request message comprising the information about the advertisement broadcast content from the MCBCS controller; and
    when the information indicating whether to perform a start alert process indicates to perform a start alert process, receiving at the service interface server a paging request message comprising the information about the advertisement broadcast zone from the MCBCS controller.

2. The method of claim 1, wherein the advertisement content transmission request message further comprises at least one of a content ID, a Multicast and Broadcast Service (MBS) zone ID, and a channel number.

3. The method of claim 1, further comprising:
    receiving an advertisement content transmission response message comprising a Uniform Resource Locator (URL) of a content server, which is to store the content, from the MCBCS controller; and
    transmitting the received advertisement content transmission response message to the service provider.

4. The method of claim 1, further comprising:
    setting a QoS associated with the advertisement broadcast content in connection with a QoS server upon receiving the QoS reservation request message comprising the information about the advertisement broadcast content from the MCBCS controller; and
    transmitting a QoS reservation response message comprising the QoS setting to the MCBCS controller.

5. The method of claim 1, further comprising:
    upon receiving the paging request message comprising the information about the advertisement broadcast zone from the MCBCS controller, transmitting the received paging request message to a Radio Access Station (RAS) in the corresponding zone in connection with a paging server; and
    upon receiving a paging response message comprising paging results from the RAS, transmitting the received paging response message to the MCBCS controller.

6. The method of claim 1, wherein the information indicating whether to perform the QoS process and the information indicating whether to perform the start alert process are each based on a selected advertisement broadcast channel and a selected advertisement broadcast zone.

7. A method for providing an advertisement broadcast service of a MultiCast and BroadCast Service (MCBCS) controller in a wireless communication system, the method comprising:

receiving, at the MCBCS controller, an advertisement content transmission request message comprising at least one of information about advertisement broadcast content, information about an advertisement broadcast zone, and information about an advertisement broadcast channel from a service interface server, the advertisement content transmission request message further comprising information indicating whether to perform a Quality of Service (QoS) process and information indicating whether to perform a start alert process;

transmitting an advertisement content transmission response message comprising a Uniform Resource Locator (URL) of a content server, which is to store the content, to the service interface server;

when the information indicating whether to perform a QoS process indicates to perform a QoS process, transmitting to the service interface server a QoS reservation request message comprising the information about the advertisement broadcast content; and when the information indicating whether to perform the start alert process indicates to perform a start alert process, transmitting to the service interface server a paging request message comprising the information about the advertisement broadcast zone.

8. The method of claim 7, wherein the advertisement content transmission request message further comprises at least one of a content ID, a Multicast and Broadcast Service (MBS) zone ID, and a channel number.

9. The method of claim 8, further comprising:
receiving a QoS reservation response message comprising a QoS setting from the service interface server.

10. The method of claim 8, further comprising:
receiving a paging response message comprising the paging results from the service interface server.

11. The method of claim 7, further comprising:
establishing a connection with a Mobile Station (MS) in the advertisement broadcast zone;
transmitting a content request message comprising the information about the advertisement broadcast content to the content server;
receiving the corresponding content from the content server; and
transmitting the received content to the MS through the established connection.

12. The method of claim 7, wherein the information indicating whether to perform the QoS process and the information indicating whether to perform the start alert process are each based on a selected advertisement broadcast channel and a selected advertisement broadcast zone.

13. A system for providing an advertisement broadcast service in a wireless communication system, the system comprising:

a service provider configured to transmit an advertisement content transmission request message comprising at least one of information about advertisement broadcast content, information about an advertisement broadcast zone, and information about an advertisement broadcast channel, the advertisement content transmission request message further comprising information indicating whether to perform a Quality of Service (QoS) process and information indicating whether to perform a start alert process;

a service interface server configured to receive the advertisement content transmission request message from the service provider and transmit the received advertisement content transmission request message to a MultiCast and BroadCast Service (MCBCS) controller; and the MCBCS controller, configured to detect the information about whether to perform the QoS process, and transmit a QoS reservation request message comprising the information about the advertisement broadcast content to the service interface server if the information about whether to perform the QoS process indicates that the QoS process is to be performed, wherein the MCBCS controller is further configured to detect the information about whether to perform the start alert process, and transmit a paging request message comprising the information about the advertisement broadcast zone to the service interface server if the information about whether to perform the start alert process indicates that the start alert process is to be performed.

14. The system of claim 13, wherein the MCBCS controller is configured to transmit an advertisement content transmission response message comprising a Uniform Resource Locator (URL) of a content server, which is to store the content, to the service interface server upon receiving the advertisement content transmission request message from the service interface server, wherein the service interface server is configured to receive the advertisement content transmission response message from the MCBCS controller and transmit the received advertisement content transmission response message to the service provider.

15. The system of claim 14, wherein the service provider is configured to store the content in the content server by using the URL.

16. The system of claim 14, wherein the advertisement content transmission request message further comprises at least one of a content ID, a Multicast and Broadcast Service (MBS) zone ID, and a channel number.

17. The system of claim 16, wherein:
the service interface server is configured to set a QoS associated with the advertisement broadcast content in connection with a QoS server upon receiving the QoS reservation request message, and transmit a QoS reservation response message comprising the QoS setting to the MCBCS controller.

18. The system of claim 16, wherein:
the MCBCS controller is further configured to receive a paging response message comprising paging results from the service interface server; and
the service interface server is configured to transmit, upon receiving the paging request message, the received paging request message to a Radio Access Station (RAS) in the advertisement broadcast zone in connection with a paging server, and transmit, upon receiving the paging response message comprising the paging results from the RAS, the received paging response message to the MCBCS controller.

19. The system of claim 18, further comprising the RAS in the advertisement broadcast zone that is configured to perform a paging process with a Mobile Station (MS) in the advertisement broadcast zone and transmit the paging response message comprising the paging results to the service interface server.

20. The system of claim 14, wherein the MCBCS controller is configured to establish a connection with a Mobile Station (MS) in the advertisement broadcast zone, transmit a content request message comprising the information about the advertisement broadcast content to the content server, and transmit, upon receiving the content from the content server, the received content to the MS through the established connection.

* * * * *